(12) United States Patent
Cialone et al.

(10) Patent No.: US 9,644,324 B2
(45) Date of Patent: *May 9, 2017

(54) THERMOSET COMPOSITE MATERIAL AND STRUCTURAL COMPONENT AND METHOD OF MAKING THE SAME FROM ENGINEERED RECYCLED RUBBER POWDER

(71) Applicant: Encell Composites, LLC, Naples, FL (US)

(72) Inventors: Anthony M. Cialone, Naples, FL (US); Michael Grubb, Westerville, OH (US); Peter Waznys, Centerport, NY (US)

(73) Assignee: ENCELL COMPOSITES, LLC, Naples, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/830,292

(22) Filed: Aug. 19, 2015

(65) Prior Publication Data
US 2015/0361250 A1    Dec. 17, 2015

Related U.S. Application Data

(63) Continuation of application No. 14/199,127, filed on Mar. 6, 2014, now abandoned, which is a (Continued)

(51) Int. Cl.
*E01B 3/46* (2006.01)
*C08K 3/36* (2006.01)
(Continued)

(52) U.S. Cl.
CPC .............. *E01B 3/46* (2013.01); *B29C 43/003* (2013.01); *B29C 43/18* (2013.01); *B29C 43/203* (2013.01);
(Continued)

(58) Field of Classification Search
CPC . B29C 2043/182; B29C 43/003; B29C 43/18; B29C 43/203; B29C 70/025;
(Continued)

(56) References Cited

U.S. PATENT DOCUMENTS 4,101,463 A    7/1978  Morgan et al.
4,244,841 A    1/1981  Frankland
(Continued)

FOREIGN PATENT DOCUMENTS

WO    93/06991       4/1993
WO    2010/039327    4/2010

*Primary Examiner* — Frances Tischler
(74) *Attorney, Agent, or Firm* — Robert L. Wolter; Beusse, Wolter, Sanks & Maire PLLC

(57) ABSTRACT

A thermoset composite material that my used in the fabrication of structural components including railroad ties comprise a substantially homogeneous blend of an amount of vulcanized rubber particles including a predetermined ratio of different particles sizes, and a thermoset elastomeric binding agent added to the vulcanized rubber particles. The blend may comprise about 30% to about 97% by weight of the vulcanized rubber particles, and the blend is subjected to compression molding at a predetermined temperature and pressure for a resident time period forming the composite material. The ratio of different rubber particle sizes is selected so that the composite material has a desired density or is within a range of desired densities.

11 Claims, 2 Drawing Sheets

Related U.S. Application Data continuation of application No. 13/151,637, filed on Jun. 2, 2011, now Pat. No. 8,680,165.

(60) Provisional application No. 61/351,369, filed on Jun. 4, 2010.

(51) Int. Cl.

| | | |
|---|---|---|
| *C08L 9/06* | (2006.01) | |
| *E01B 3/44* | (2006.01) | |
| *C08G 18/10* | (2006.01) | |
| *B29C 43/00* | (2006.01) | |
| *B29C 70/02* | (2006.01) | |
| *C08J 3/20* | (2006.01) | |
| *C08J 5/00* | (2006.01) | |
| *C08L 21/00* | (2006.01) | |
| *C08K 7/02* | (2006.01) | |
| *B29C 43/18* | (2006.01) | |
| *B29C 43/20* | (2006.01) | |
| *B29K 21/00* | (2006.01) | |
| *B29K 75/00* | (2006.01) | |
| *B29K 105/08* | (2006.01) | |
| *B29K 105/16* | (2006.01) | |
| *B29K 105/26* | (2006.01) | |
| *B29K 309/08* | (2006.01) | |
| *B29K 509/00* | (2006.01) | |

(52) U.S. Cl.
CPC ............ *B29C 70/025* (2013.01); *C08G 18/10* (2013.01); *C08J 3/203* (2013.01); *C08J 5/00* (2013.01); *C08K 3/36* (2013.01); *C08K 7/02* (2013.01); *C08L 9/06* (2013.01); *C08L 21/00* (2013.01); *E01B 3/44* (2013.01); *B29C 2043/182* (2013.01); *B29K 2021/00* (2013.01); *B29K 2021/006* (2013.01); *B29K 2075/00* (2013.01); *B29K 2075/02* (2013.01); *B29K 2105/0809* (2013.01); *B29K 2105/16* (2013.01); *B29K 2105/26* (2013.01); *B29K 2309/08* (2013.01); *B29K 2509/00* (2013.01); *C08J 2321/00* (2013.01); *C08J 2475/02* (2013.01)

(58) Field of Classification Search
CPC .......... B29K 2021/00; B29K 2021/006; B29K 2075/00; B29K 2075/02; B29K 2105/0809; B29K 2105/16; B29K 2105/26; B29K 2309/08; B29K 2509/00; C08G 18/10; C08J 2321/00; C08J 2475/02; C08J 5/00; C08K 3/36; C08K 7/02; C08L 21/00; C08L 9/06; E01B 3/44; E01B 3/46
USPC ...................................... 521/40, 40.5, 41, 43
See application file for complete search history.

(56) References Cited

U.S. PATENT DOCUMENTS

| | | |
|---|---|---|
| 4,481,335 A | 11/1984 | Stark, Jr. |
| 4,970,043 A | 11/1990 | Doan et al. |
| 5,037,628 A | 8/1991 | Fader |
| 5,094,905 A | 3/1992 | Murray |
| 5,238,734 A | 8/1993 | Murray |
| 5,258,222 A | 11/1993 | Crivelli |
| 5,488,080 A | 1/1996 | Osborn |
| 5,506,274 A | 4/1996 | Brown |
| 5,510,419 A | 4/1996 | Burgoyne et al. |
| 5,588,600 A | 12/1996 | Perfido et al. |
| 5,591,794 A | 1/1997 | Fukumoto et al. |
| 5,604,277 A | 2/1997 | Osborn |
| 5,844,043 A | 12/1998 | Peter et al. |
| 5,861,117 A | 1/1999 | Rosenbaum |
| 5,883,139 A | 3/1999 | Wideman et al. |
| 5,889,119 A | 3/1999 | Coran et al. |
| 6,194,519 B1 | 2/2001 | Blalock et al. |
| 6,207,723 B1 | 3/2001 | Matsushita et al. |
| 6,247,651 B1 | 6/2001 | Mrinelli |
| 6,262,175 B1 | 7/2001 | Jury et al. |
| 6,265,454 B1 | 7/2001 | McNutt et al. |
| 6,344,160 B1 | 2/2002 | Holtzberg |
| 6,387,966 B1 | 5/2002 | Goldshtein et al. |
| 6,565,918 B2 * | 5/2003 | Hughes .................. C08G 18/12 427/136 |
| 6,797,757 B2 | 9/2004 | Wideman et al. |
| 6,821,623 B2 | 11/2004 | Kvesic |
| 6,828,372 B2 | 12/2004 | Sullivan et al. |
| 6,896,964 B2 | 5/2005 | Kvesic |
| 6,959,877 B2 | 11/2005 | Diamond |
| 7,093,781 B2 | 8/2006 | Meckert et al. |
| 7,108,207 B2 | 9/2006 | Waznys et al. |
| 2002/0123553 A1* | 9/2002 | Sullivan .............. B29B 17/0042 524/449 |
| 2004/0232253 A1 | 11/2004 | Hansen |
| 2005/0065267 A1 | 3/2005 | Sullivan et al. |
| 2006/0008612 A1 | 1/2006 | Brazier et al. |
| 2006/0024453 A1 | 2/2006 | Setser et al. |
| 2007/0015605 A1 | 1/2007 | Kim et al. |
| 2007/0231532 A1 | 10/2007 | Waters et al. |
| 2011/0028257 A1 | 2/2011 | Sealey et al. |

\* cited by examiner

THERMOSET COMPOSITE MATERIAL AND STRUCTURAL COMPONENT AND METHOD OF MAKING THE SAME FROM ENGINEERED RECYCLED RUBBER POWDER

CROSS-REFERENCE TO RELATED APPLICATIONS

This application is a continuation of U.S. application Ser. No. 14/199,127 filed Mar. 6, 2014, now abandoned, which is a continuation of U.S. application Ser. No. 13/151,637 filed Jun. 2, 2011, issued as U.S. Pat. No. 8,680,165 on Mar. 25, 2014, which claims the benefit of U.S. Provisional Application No. 61/351,369 filed Jun. 4, 2010, and incorporated herein by reference in their entirety.

FIELD OF THE INVENTION

The present invention relates to composite materials used in the fabrication of structural components, and the methods of making such composite materials. More specifically, embodiments of the invention pertain to thermoset composite materials made from engineered recycled rubber powder.

Various processes and methods have been developed for comminuting discarded rubber articles, such as tires, wherein the discarded rubber articles are reduced to sizes that can be reused in production of new rubber products. The particulate form of this rubber product is often referred to as crumb rubber or rubber powder. Rubber comminuting processes and apparatus must overcome the high degree of elasticity of rubber. Indeed, the grinding or sheering of rubber products at ambient temperatures generates sufficient heat whereby the resultant rubber particles that are relatively non-reactive. Moreover, such processes produce a crumb rubber that includes larger and non-uniform particulate sizes. While the crumb rubber produced by these processes was inexpensive and economical to use to fabricate new rubber products, the crumb rubber could not be used to develop a "rubber-based" product. That is, the crumb rubber is essentially used as filler materials, because the rubber polymer could not be cross-linked with other polymers.

Indeed, crumb rubber has been used as a secondary ingredient in technical compounds and products, and has not been used as the primary base polymer to which the composite is formulated and other additives and constituents are added too. Typical commercial loadings for technical materials have been in the range of 1% to 15%. In such instances crumb rubber is used as a non-technical filler to reduce overall compound costs, and may detract from the technical properties of the base polymers. For example, adding more crumb rubber would effectively reduce tensile strength of a composite material.

Due to its inability to bond chemically, some prior art composites have been formulated employing plastics as the base polymer and utilized extruding molding technologies in order to encapsulate the crumb rubber. In addition, thermoplastic elastomers (TPE's) used in the past had poor chemical and heat resistance and low thermal stability. Such TPE's often soften or melt at elevated temperatures derogating the polymer chain, making the composite material unusable.

Other processes for comminuting rubber articles have been developed whereby certain steps are thermally-controlled. That is, the temperature of the rubber particles is controlled or maintained at sufficiently low temperatures so that the temperature of the rubber during processing does not rise above its glass transition temperature causing the inherent elastic properties to emerge. Such processes are able to produce crumb rubber powder with much smaller particle sizes and more uniform distribution of a particle size. In addition, the crumb rubber particles may potentially be more reactive and capable of chemical bonding with other polymers. However, to date processes, methods or apparatuses have not been developed to take advantage of this technology to produce composite materials that are molded or configured to be used as functional structural components.

Providing a composite material that includes as its base material engineered recycled rubber particles that are used to fabricate structural components such as railroad ties may be particularly advantageous. As developing countries build out their transportation infrastructure in harsh climates (extreme heat/cold, moisture, UV/sunlight, insects, etc), longer lasting technical materials need to be used in order to amortize upfront costs over longer periods for financing and to reduce the cost of maintenance. Such use of composite materials can overcome difficulties of servicing tracks in remote locations, and reduce waste disposal.

BRIEF DESCRIPTION OF THE INVENTION

An embodiment of the invention includes a thermoset composite material that incorporates engineered recycled rubber particles (ERRP) as a base polymer and a primary component to which supplementary ingredients are added to enhance and improve desired mechanical and physical properties. Typical loadings may include as much as 30% by weight of ERRP, or more and typically loadings may range from 60% to 90%, blended with a thermoset elastomeric binding agent. This blend is subjected to compressive molding forces at predetermined pressures and temperatures to form a thermoset composite material that can be used as a structural component such as a railroad tie.

Because the composite material employs ERRP as the technical based polymer, the ERRP represents the largest constituent per pound of finished composite. As certain additives are incorporated and compounded in specific ways and at predetermined times in the process, the properties of the composite are enhanced. Embodiments of the thermoset composite material will not only allow railroad ties to meet industry specifications, but also allow installation using the same equipment and fastening devices currently in use to install conventional ties. The thermoset composite material is made from recycled materials and may be manufactured to qualify as a carbon offset when compared to other railroad tie materials such as wood, concrete, plastic and other composites.

DETAILED DESCRIPTION OF THE INVENTION

Figure 1:
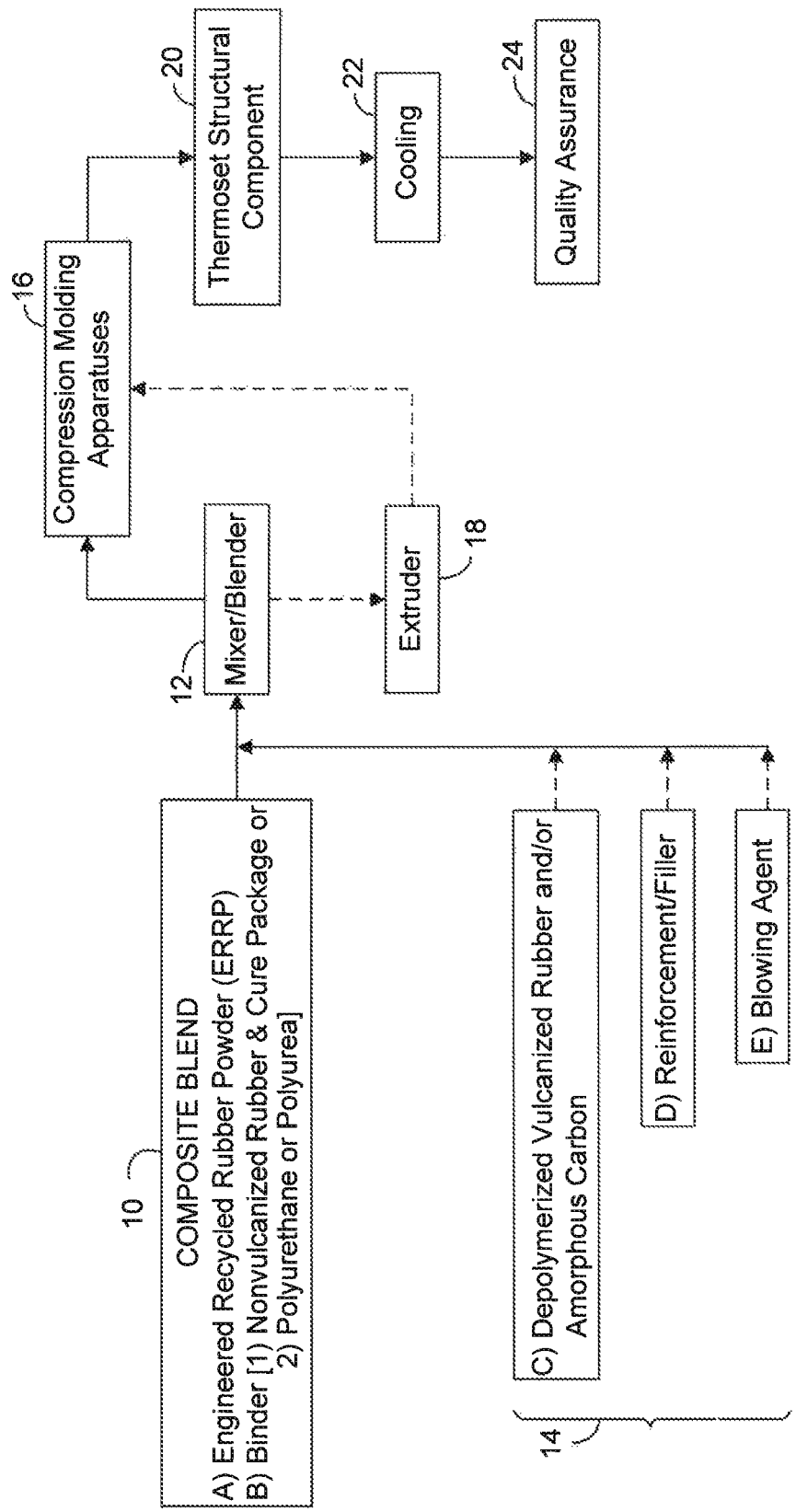
FIG. 1 is a flow diagram describing the process for making the thermoset composite material.

An embodiment of the invention for a thermoset composite material may be fabricated from a blend of recycled vulcanized crumb rubber powder, also referred to as engineered recycled rubber powder ("ERRP") and a thermoset elastomeric binding agent. This blend is mixed to form a homogeneous mixture of the components and then is molded under sufficient heat and pressure for a resident time to form a composite material. In one embodiment, the thermoset elastomeric binding agent is a non-vulcanized rubber (provided preferably in granulated form) combined with a "cure package", which facilitates the vulcanization of the rubber when the blend is subjected to heat and pressure. In another embodiment, the blend may include the ERRP combined with a thermoset polyurethane or polyurea resin, which is also subjected to heat and pressure to provide a thermoset composite material. In either embodiment, the molded composite material has the desired properties such as density, tensile strength, hardness and bending stiffness to serve as a structural component such as a railroad crosstie.

The ERRP or vulcanized rubber particles may be produced from known processes such as methods disclosed in U.S. Pat. Nos. 5,588,600; 7,093,781; and, 7,108,207 for comminuting particle rubber, which are incorporated herein by reference. Such methods include steps for cooling or freezing rubber particles at cryogenic temperatures, before comminuting the rubber. Such crumb rubber powder includes the above-referenced ERRP and may also be referred to as cryogenically granulated rubber powder. This crumb rubber powder exhibits a unique surface suitable to interfacial adhesion and excellent mechanical properties when processed in forming a composite material. Indeed, the use of this rubber powder may reduce the need for expensive modifiers.

The invention is also contemplated to cover any ERRP or vulcanized rubber particles that are fabricated under thermally controlled conditions, such as controlling the temperature of the rubber material during grinding steps or other steps in a comminuting process. Thus, the term "thermally-controlled granulated rubber" as used herein shall mean any vulcanized crumb rubber or rubber product in particulate form that is fabricated under thermally controlled conditions such that temperature of the rubber is maintained below a predetermined temperature that may have a deleterious effect on the physical or mechanical characteristics of the rubber.

The non-vulcanized rubber component may be a scrap rubber formulated for use in production of rubber products such as tires; however, the rubber is scrapped as a result of not meeting manufacturing specifications. This scrap rubber is also commonly referred to as "green rubber". When using the green rubber or non-vulcanized rubber, vulcanizing agents are added to facilitate vulcanization of the non-vulcanized rubber. Thus, a "cure package" may be added to the blend, wherein the cure package may comprise sulfur in combination with additives such as accelerators, activators such as zinc oxide, stearic acid, antidegradants and/or antioxidants. The "cure package" provides for cross-linking of the non-vulcanized rubber (either natural rubber or styrenebutadiene rubber (SBR)) to stabilize the thermoset composite material.

In addition, a de-polymerized vulcanized rubber, also known as Pyro-Black, which is typically produced by the de-polymerization of scrap tires, may be added to either of the two embodiments of the blend. In an alternative embodiment, or alternatively to utilizing Pyro-Black, Carbon Black may be used. Carbon Black is a form of amorphous carbon that also has a high surface-area-to-volume ratio.

Embodiments of the invention are set forth in the below Table I; however, the invention is not limited to these embodiments and may include the components of the composition or blend at different concentrations or different concentration ranges:

TABLE I

| | lbs | % loading | lbs | % loading | lbs | % loading |
|---|---|---|---|---|---|---|
| Scrap Green Rubber - SBR Base | 157.5 | 70% | 112.5 | 50% | 67.5 | 30% |
| Recycled Engineered Rubber Powder | 45 | 20% | 90 | 40% | 112.5 | 50% |
| Pyro-Black | 18 | 8% | 18 | 8% | 18 | 8% |
| Other ingredients | 4.5 | 2% | 4.5 | 2% | 27 | 12% |
| | 225 | 100% | 225 | 100% | 225 | 100% |

As shown a blend is formulated including about 30% to about 70% by weight of the non-vulcanized scrap rubber; about 20% to about 50% by weight of the vulcanized recycled engineered powder, about 8% by weight of the Pyro-Black or Carbon Black; and, about 2% to about 12% by weight of other ingredients. The "other ingredients" include the above mentioned "cure package" including the sulfur, accelerators, activators etc. In addition, the "other ingredients" may include binding agents and/or compatibilizers that are known to be used with recycled rubber compounds in the manufacture of composite materials. About 1% to 5% by weight of the blend may comprise the "cure package" including sulfur and other additives depending on the ratio of green to crumb rubber used.

In addition to the foregoing components, a blowing agent may be added to the mixture to control some end-product characteristics such as elasticity, hardness, tensil strength, compression, weight, etc. Known blowing agents that may be used with the above-described rubber materials may be selected from a group of blowing agents known as sulphohydrazides, which may decompose at temperatures lower relative to some other blowing agents. The sulphohydrazides may have a decomposition temperature of about 105° C. or higher, compared to azodicarbonamides which may have decomposition temperatures ranging from about 165° C. to about 210° C. As described in more detail, the blowing agents may be introduced into the homogeneous mixture before the vulcanization/compression molding stage of the described process/method begins.

The particle size of the vulcanized rubber powder and non-vulcanized rubber may vary according to the desired mechanical or physical properties of thermoset composite material fabricated using the blend. When referring to a particle size the term "mesh" may be used to refer to a sample of rubber particles having generally a single size or diameter, or a range of sizes. For example, a sample or an amount of rubber particles in which the particles have a 10 mesh size shall mean that a percentage (typically 95%) of the particles for the given sample has a diameter of 2 mm or less, or 95% of the particles will pass through a 10 mesh sieve. When referring to a sample, or given amount of rubber particles, having a range of mesh sizes shall it is meant that a certain percentage (typically 95%) of the rubber particles for that sample are within the designated range. For example, a sample having rubber particles in the range of −40 mesh to +60 mesh shall refer to particle sizes wherein about 95% of the particles will pass through a 40 mesh sieve, but also be retained by a 60 mesh sieve. In this example, the particles of the given sample would have a diameter from about 0.25 mm (250 μm) to about 0.4 mm (400 μm).

The thermally-controlled granulated vulcanized rubber particles or ERRP, as compared to other crumb rubber products, have more chemically active sites making it more reactive, thereby, providing a level of cross-linking between the rubber particles and other polymers possible. Accordingly, the size of the particles and distribution of a particle size within a sample of the ERRP directly affects the cross-linking capabilities of the ERRP with other polymers, such as the above-described thermoset elastomeric bonding agents.

It follows, that the particle size and particle size distribution of the vulcanized rubber particles has a direct effect on physical properties of the blend before the blend is cured, which effects the processing of the blend and/or curing process. For example, smaller particle size and particle size distribution may increase the viscosity of the blend, which may increase an incorporation time during mixing to create the homogenous blend. In addition, a larger particle size distribution may result in the blend, in an extruded or molded form, to shrink or swell more than smaller particles, which will directly affect the amount of the blend used to mold and form structural component according to certain dimensions and configurations. In addition, the particle size and size distribution directly affects the density of the final composite material, which in turn affects other mechanical and physical properties of the thermoset composite material. For example, tensile strength of the composite material increases as the number of smaller particles increase; an increase in hardness is consistent with smaller particles sizes and distributions; or, the percentage of elongation at break also increases with smaller particle sizes.

With respect to embodiments of the invention, the particle size for the vulcanized rubber particles for a given blend may range anywhere from about 10 mesh to about 140 mesh. That is the size for all of the vulcanized rubber particles for a selected amount of ERRP may be a single size selected from the size range from 10 mesh (larger) through 140 mesh (smaller). Alternatively, the size of all of the particles for a selected amount of ERRP may vary in size such that there are particles that are no larger than 10 mesh and no smaller than 140 mesh. Preferably, the particle size is in the range of about 10 mesh to about 60 mesh, and more preferably form about 20 mesh to about 40 mesh.

In an embodiment, a selected amount of ERRP used in the blend may have a predetermined ratio of different sizes of the vulcanized rubber particles. This ratio of different particle sizes may be selected according to one or more desired physical or mechanical properties of the thermoset composite material, which properties may be dependent on the function of the structural component fabricated from the thermoset composite material. By way of example, a railroad tie which requires a high degree of stiffness with good tensile strength properties may be fabricated from a blend of the ERRP and the thermoset elastomeric binding agent and have a density ranging from 45 lb/ft$^3$ to about 80 lb/ft$^3$, and preferably a density ranging from 60 lb/ft$^3$ to about 70 lb/ft$^3$. A blend including the ERRP for such a structural component may include a ratio of particles sizes of the ERRP as follows:

about 25% of the particles have a −20 mesh size (25% have an average diameter of 707 microns or smaller);
about 25% of the particles have a −40 mesh to +60 mesh size (25% have a diameter of 250 microns−400 microns); and,
about 50% of the particles having a −80 mesh size (25% having an average diameter of 177 microns or smaller).

Such a blend of ERRP and the binding agent may produce a thermoset composite material having a density that is at least 60 lbs/ft$^3$.

In another example, the ratio of different sizes of particles may include a higher content of larger particles to affect a physical characteristic of the composite material. For example, an increase of larger particle size distribution may allow for additional vibration damping, and the thermoset composite material may of have a density of about 45-50 lbs/ft$^3$. Such a blend may include ERRP with a ratio of particle sizes including:

about 33% of the particles having a −20 mesh size (33% have an average diameter of 707 microns or smaller);
about 33% of the particles of −40 mesh to +60 mesh size (33% have a diameter of 250 microns-400 microns); and,
about 33% of the particles have −80 mesh (33% having an average diameter of 177 microns or smaller).

In yet another example, a desired amount of elasticity may necessary for a vertical structural component such as a marine piling, wherein the thermoset composite material may have a density of about 40-50 lbs/ft$^3$. Such a blend may include ERRP with a ratio of particle sizes including:

about 40% of the particles having a −20 mesh size (40% have an average diameter of 707 microns or smaller);
about 30% of the particles of −40 mesh to +60 mesh size (30% have a diameter of 250 microns-400 microns); and,
about 30% of the particles have −80 mesh (33% having an average diameter of 177 microns or smaller).

With respect to FIG. 1, there is shown a flow diagram that outlines a method for making a thermoset composite material; or, the same may be characterized as a method of fabricating a structural component from a thermoset composite material. In a first step 10, each of the components including the ERRP and the binder, which may include non-vulcanized rubber particles in combination with the above-referenced "cure package" is introduced into a mixer (preferably a high shear mixer). Alternatively, a polyurethane/polyurea binding agent may be mixed with the ERRP instead of the non-vulcanized rubber and cure package. As known to those skilled in the art, high shear mixers may have counter-rotating rotors that may generate considerable heat during the mixing process; therefore, measures may be taken to maintain the temperature of the mixture, or an interior of the high shear mixture, below temperatures at which vulcanization may occur. Typical temperatures for high shear mixing may be controlled from 100° F. to 175° F.

In an alternative step 12, additives such as de-polymerized vulcanized rubber, fillers, blowing agents, compatibilizers, etc., may be introduced at this stage. Some examples of fillers may include recycled fibrous materials such as recycled currency or carpet, calcium carbonate, MISTRON® monomix talc or MISTRON® vapor talc or a granulated silica. It is understood that such a granulated silica has not been used any rubber formulation to date.

Again in reference to step 12 regading introduction of a blowing agent into the blend, the blowing agent may be added in an amount of about 0.00% to 0.5%, and preferably 0.025% to about 0.5% of the blend/composite material when added. Blowing agents are known as substances that may be mixed into a variety of materials, including rubber materials, that undergo a controlled degradation, which liberates inert gas under the temperatures and pressures of compression molding to generate cellular structures within the composite matrix. The stage at which the blowing agent is introduced into the homogeneous mixture may depend on the type of blowing agent used. For example, a blowing agent that decomposes at lower temperatures, such as sulphohydrazines, may be introduced to the homogeneous mixture prior to injection into the compression molding/vulcanization stage. To that end, blowing agents, such as azodicarbonamides that decompose at higher temperatures may be introduced earlier into the homogeneous mixture at the mixing stage. Introduction of the blowing agent into the high shear mixer may also be dictated by the mixing temperature. A sufficient amount of blowing agent should be introduced in order to achieve the desired physical properties of the end product.

At step 14, the above-described blend is mixed in the high shear mixer to achieve a substantially or generally homogeneous mix of the rubber and binder components. The term homogeneous as used herein generally means that the mixture has the same proportions throughout a given sample or multiple samples of different proportion to create a consistent mixture. With respect to the weights of the compositions or blends set forth in Table I above and the below described compositions in Tables II-XII, the mixing step 14 may take 5-10 minutes, or possibly shorter or longer depending on the volume or weight of the blend. Similar mixing parameters may be used with the embodiment of the blend including the polyurethane or polyurea.

With respect to step 16, the homogeneous mixture is introduced into one or more molds of a compression molding apparatuses wherein the mixture undergoes compressed molding at a predetermined temperature, a predetermined pressure and for a resident time period. Depending on the type of structural component being manufactured a plurality of molds may be provided that are dimensioned to form the desired structural components. For example, molds dimensioned to form railroad ties may be provided wherein the railroad tie manufactured may be 7"×9"×102"(or 108"). In such a case, the homogeneous mixture may be subjected from about 1,000 psi to 4,500 psi for a resident time of about 6 minutes to about 10 minutes at a temperature ranging from about 200° F. to about 350° F. These cited parameters are provided by way of example, and one skilled in the art will appreciate that these parameters may vary according to the dimensions of the structural component, according to the other physical characteristics such as elasticity, stiffness, hardness, compression strength, etc. and/or the concentrations levels of the different components.

An additional step 18 is also referenced in FIG. 1, wherein the homogeneous mixture undergoes extrusion during the delivery of the homogeneous mixture from the high shear mixer to the compression molding process. An extruder may deliver the mixture under pressure and temperature in order to maintain the mixture at a desired viscosity for delivery to the compression molding process. In addition, the extrusion may also maintain the homogeneous characteristic of the mixture; and, the amount or quantity extruded must correspond to the physical dimensions of the structural component to be fabricated. The extrusion may take place at temperatures of about 325° F. to about 400° F. at pressures ranging from pout 750 psi to about 1500 psi.

At steps 20 and 22, a structural component developed from the above-described method and blend is removed from the mold and allowed to cool. The component may be cooled to ambient room temperature. Finally, at step 24 quality assurance tests may be conducted on one or more sample structural components to determine if the component meets some predetermined criteria or physical property profile to function for an intended purpose.

Sample Testing of ERRP and Non-Vulcanized SBR

Samples of a thermoset composition including the ERRP, non-vulcanized rubber and a cure package were subjected to pressure and heat for a resident time and then tested to determine various mechanical or physical properties. A control formulation was developed and included the following components as set forth below in Table II:

TABLE II

| Control Formulation | |
|---|---|
| SBR 1805 Off-Grade | 212.5 phr[1] |
| Zinc Oxide | 5 phr |
| Stearic Acid | 1 phr |
| TMQ[2] | 2 phr |
| IPPD[3] | 2 phr |
| CBTS[4] | 1.5 phr |
| RMS[5] | 2 phr |
| TBBS[6] | 1 phr |
| PEG[7] 3350 | 3 phr |

[1]parts per hundred rubber;
[2]trimethyl dihydroquinoline (antioxidant)
[3]isopropyl phenyl phenylendiamine (antioxidant)
[4]cyclohexyl benzothiazole sulfenamide (accelerator)
[5]rubber makers' sulfur (primary curative agent)
[6]tertiary butyl benzothiazole sulfenaminde (delayed accelerator)

The SBR 1805 is a styrene-butadiene non-vulcanized rubber that was used in place of green or scrap rubber. In addition, the SBR was provided in ¼"×¼"×4" strips; however, the SBR may be added in granulated or powder form with a particulate size of about 30-80 mesh. The cure package included zinc oxide, stearic acid and the above listed compounds, which are typically found in vulcanizing cure packages. In order to evaluate, the affect of engineered recycled rubber powder in the test samples, the control formulation did not include any ERRP. In comparison, tested samples included ERRP at different concentrations and with different sized particles. The ERRP was obtained from Liberty Tire Recycling which has a corporate headquarters located in Pittsburgh, Pa., and included cryogenically granulated rubber powder.

The Control Formulation including the SBR and cure package was milled for 7 minutes in a two roll mill at a maximum temperature of about 150° F., to form a "masterbatch" that was tested and used to create the test samples including the ERRP. A control sample of the master-batch was then placed in a mold and subject to compression molding at 4,500 psi for 10 minutes at about 350° F. This control sample was tested to measure various physical properties including hardness (Shore Durometer A), tensile strength, and elongation percentage at break and tensile modulus at different levels of elongation. The test results for the Control Formulation are provided in the below Table III:

TABLE III

| Durometer Shore A | 65 |
|---|---|
| Tensile Strength PSI | 405.6 |
| Elongation % @ Break | 126.9 |
| 10% Modulus PSI | 74.3 |
| 25% Modulus PSI | 120.7 |
| 50% Modulus PSI | 184.4 |
| 100% Modulus PSI | 330.6 |
| Density lbs/cu. ft. | 71.9 |

As described above, ERRP was added to portions of the master-batch at different concentrations and having different granular or particle sizes. ERRP, having particle sizes ranging from 10 mesh to 18 mesh (Table IV), was added to respective portions of the master-batch at concentrations of 20% by weight, 40% by weight and 50% by weight; and ERRP having particle sizes ranging from 10 mesh to 30 mesh (Table V) were added to respective portions of the master-batch at concentrations of 20% by weight, 40% by weight and 50% by weight. In addition, ERRP having a distributed particulate size of 20 mesh (Table VI) was added to respective portions of the master-batch at concentrations of 20% by weight, 40% by weight and 50% by weight; and, ERRP having a distributed particulate size of 30 mesh (Table VII) was added to respective portions of the master-batch at concentrations of 20% by weight, 40% by weight and 50% by weight.

The ERRP was added to the master-batch of the Control Formulation during milling in a two roll miller, which milling was conducted for 7 minutes at a temperature of about 150° F. Then the test samples were placed in molds and subjected to compression molding at a pressure of about 4,500 psi at a temperature of about 350° F. for about 10 minutes. The samples were then tested to measure the above-described physical properties. These test results are provided in the below Tables IV-VII:

TABLE IV

| 10-18 Mesh ERRP | | | |
| --- | --- | --- | --- |
| % by wt. ERRP | 20 | 40 | 50 |
| Durometer Shore A | 69 | 75 | 79 |
| Tensile Strength PSI | 488.3 | 472.5 | 432.4 |
| Elongation % @ Break | 175.1 | 156.3 | 147.6 |
| 10% Modulus PSI | 84.1 | 89 | 84.3 |
| 25% Modulus PSI | 133.1 | 142.9 | 136.6 |
| 50% Modulus PSI | 197.8 | 209.5 | 201.4 |
| 100% Modulus PSI | 329.3 | 348 | 331.1 |
| Density lbs/cu. ft. | 72.2 | 72.6 | 72.7 |

TABLE V

| 10-30 Mesh ERRP | | | |
| --- | --- | --- | --- |
| % by wt. ERRP | 20 | 40 | 50 |
| Durometer Shore A | 68 | 70 | 73 |
| Tensile Strength PSI | 471.8 | 478.2 | 506.9 |
| Elongation % @ Break | 165.6 | 157.2 | 171.6 |
| 10% Modulus PSI | 49.4 | 85 | 84.7 |
| 25% Modulus PSI | 126 | 137.8 | 139.9 |
| 50% Modulus PSI | 190.9 | 201.8 | 207.4 |
| 100% Modulus PSI | 331.3 | 338.3 | 345.3 |
| Density lbs/cu. ft. | 72.1 | 72.5 | 72.6 |

TABLE VI

| 20 Mesh ERRP | | | |
| --- | --- | --- | --- |
| % by wt. ERRP | 20 | 40 | 50 |
| Durometer Shore A | 70 | 72 | 75 |
| Tensile Strength PSI | 503.2 | 560.2 | 518.3 |
| Elongation % @ Break | 162.7 | 167.6 | 155.3 |
| 10% Modulus PSI | 84 | 92.9 | 91.4 |
| 25% Modulus PSI | 137.8 | 150.3 | 148.7 |
| 50% Modulus PSI | 205.1 | 223.3 | 220.9 |
| 100% Modulus PSI | 351.3 | 382.2 | 372.1 |
| Density lbs/cu. ft. | 72.2 | 72.6 | 72.9 |

TABLE VII

| 30 Mesh ERRP | | | |
| --- | --- | --- | --- |
| % by wt. ERRP | 20 | 40 | 50 |
| Durometer Shore A | 71 | 73 | 74 |
| Tensile Strength PSI | 538.2 | 557.7 | 625.3 |
| Elongation % @ Break | 168.9 | 161.6 | 180.2 |
| 10% Modulus PSI | 87.4 | 86.9 | 92.3 |
| 25% Modulus PSI | 142.2 | 148.7 | 156.4 |
| 50% Modulus PSI | 210.8 | 223.4 | 233.3 |
| 100% Modulus PSI | 361.9 | 381.7 | 399.9 |
| Density lbs/cu. ft. | 72.3 | 73 | 74 |

In general, the addition of the ERRP enhanced the physical properties of the samples relative to the Control Formulation. The test results also show that an optimum concentration be about 40% to about 50% by weight of the ERRP. In addition, the smaller particle size produced a better overall property profile. That is, the samples that included the 20 mesh and 30 mesh particle size distributions as compared to the samples with larger size particles or samples having the range of particle sizes, produced a better overall property profile.

A masterbatch of the Control Formulation (including the SBR and cure package) was also prepared for mixing with ERRP and other additives such as blowing agents and binding fillers. More specifically, fillers including MISTRON® monomix talc and VCAR 140 ground silica (a granulated recycled silica) were added to different samples; and, blowing agents including as AZO (azodicarbonamide) blowing agent and an OBSH (oxybis benzene sulfonyl hydrazide) blowing agent.

With respect to the use of the fillers as set forth in Tables VIII and IX, the control sample included 80% by weight of the masterbatch and 20% by weight of the respective fillers. With respect to the samples including the ERRP with the filler, samples included 40% by weight of the masterbatch, 40% by weight of the ERRP and 20% by weight of the respective filler. Again four different particle sizes of the ERRP including samples having particles sizes ranging from 10-18 mesh and 10-30 mesh. In addition, samples having a particle size distribution of 20 mesh and 30 mesh were including in the testing.

With respect to the samples including the blowing agents set forth in Tables X and XI, the control sample included 99.5% by weight of the masterbatch and 0.5% by weight of the blowing agent. The samples with the ERRP included 59.5% by weight of the masterbatch, 40% by weight of the ERRP and 0.5% by weight of the blowing agent. Again, these samples included the above-described ERRP particle sizes. All samples in which the fillers and blowing agents were added included the above-described cryogenically granulated ERRP.

The samples were prepared as described above including milling the constituents of a blend in a two roll miller for 7 minutes. The blends were then placed in a mold and heated for 10 minutes at 350° F. and 4,500 psi of pressure. The test results for the samples including the fillers are listed in Tables VIII and Tables IX; and, the test results for the samples including the blowing agents are listed in Tables X and XI below:

TABLE VIII

| | S501 (control) | S502 | S503 | S504 | S505 |
| --- | --- | --- | --- | --- | --- |
| | Concentration % by wt. | | | | |
| SPS SBR Masterbatch | 80 | 40 | 40 | 40 | 40 |
| Mistron Mono Mix Talc | 20 | 20 | 20 | 20 | 20 |

TABLE VIII-continued

|  | S501 (control) | S502 | S503 | S504 | S505 |
|---|---|---|---|---|---|
| ERRP 10-18 mesh |  | 40 |  |  |  |
| ERRP 10-30 mesh |  |  | 40 |  |  |
| ERRP 20 mesh |  |  |  | 40 |  |
| ERRP 30 mesh |  |  |  |  | 40 |
| Test Results |  |  |  |  |  |
| Durometer Shore A | 79 | 76 | 81 | 81 | 81 |
| Tensile Strength | 558.2 | 426.6 | 492 | 465.5 | 426.7 |
| Elongation @ break | 84.4 | 41.6 | 50.7 | 47.6 | 46.8 |
| 100% Modulus | 0 | 0 | 0 | 0 | 0 |
| Density lbs/cu ft | 81.3 | 82.2 | 82.2 | 82.2 | 82.2 |

TABLE IX

|  | S601 (control) | S602 | S603 | S604 | S605 |
|---|---|---|---|---|---|
| Concentration % by wt. |  |  |  |  |  |
| SBR Masterbatch | 80 | 40 | 40 | 40 | 40 |
| VCAR 140 ground silica | 20 | 20 | 20 | 20 | 20 |
| ERRP 10-18 mesh |  | 40 |  |  |  |
| ERRP 10-30 mesh |  |  | 40 |  |  |
| ERRP 20 mesh |  |  |  | 40 |  |
| ERRP 30 mesh |  |  |  |  | 40 |
| Test Results |  |  |  |  |  |
| Durometer Shore A | 79 | 77 | 72 | 75 | 77 |
| Tensile Strength | 530.8 | 395.4 | 397.4 | 414.2 | 513.7 |
| Elongation @ break | 126.2 | 96.9 | 100.1 | 111.1 | 124.4 |
| 100% Modulus | 462.1 | 0 | 399.6 | 417.5 | 466.7 |
| Density lbs/cu ft | 80.9 | 81.8 | 81.8 | 81.8 | 81.8 |

TABLE X

|  | S1001 (control) | S1002 | S1003 | S1004 | S1005 |
|---|---|---|---|---|---|
| Concentration % by wt. |  |  |  |  |  |
| SBR Masterbatch | 99.5 | 59.5 | 59.5 | 59.5 | 59.5 |
| OBSH Blowing Agent | 0.5 | 0.5 | 0.5 | 0.5 | 0.5 |
| ERRP 10-18 mesh |  | 40 |  |  |  |
| ERRP 10-30 mesh |  |  | 40 |  |  |
| ERRP 20 mesh |  |  |  | 40 |  |
| ERRP 30 mesh |  |  |  |  | 40 |
| Test Results |  |  |  |  |  |
| Durometer Shore A | 55 | 65 | 66 | 70 | 66 |
| Tensile Strength | 440.5 | 481.8 | 550.3 | 642.9 | 578.7 |
| Elongation @ break | 162.3 | 149.1 | 155.8 | 159.3 | 145.6 |
| 100% Modulus | 289.9 | 374.4 | 406.8 | 438.8 | 450.4 |
| Density lbs/cu ft | 72 | 72.3 | 72.3 | 72.3 | 72.3 |

TABLE XI

|  | S1101 (control) | S1102 | S1103 | S1104 | S1105 |
|---|---|---|---|---|---|
| Concentration % by wt. |  |  |  |  |  |
| SBR Masterbatch | 99.5 | 59.5 | 59.5 | 59.5 | 59.5 |
| AZO blowing agent | 0.5 | 0.5 | 0.5 | 0.5 | 0.5 |
| ERRP 10-18 mesh |  | 40 |  |  |  |
| ERRP 10-30 mesh |  |  | 40 |  |  |
| ERRP 20 mesh |  |  |  | 40 |  |
| ERRP 30 mesh |  |  |  |  | 40 |
| Test Results |  |  |  |  |  |
| Durometer Shore A | 73 | 67 | 73 | 70 | 63 |
| Tensile Strength | 687.2 | 478.1 | 606.6 | 681 | 662 |

TABLE XI-continued

|  | S1101 (control) | S1102 | S1103 | S1104 | S1105 |
|---|---|---|---|---|---|
| Elongation @ break | 120.3 | 101.6 | 122.4 | 131.5 | 128.5 |
| 100% Modulus | 619.8 | 461 | 530.2 | 558.4 | 538.2 |
| Density lbs/cu ft | 72.2 | 72.6 | 72.6 | 72.6 | 72.6 |

Sample Testing of ERRP and Polyurethane

Samples of a blend including the ERRP and polyurethane were also formulated, molded and tested. More specifically, a blend of about 95% ERRP and about 5% polyurethane (Marchem Series 3800 urethane pre-polymer binder) was mixed in a laboratory Hobart ribbon blender for about 3-5 minutes. The samples included cryogenically granulated ERRP with particles sizes of 10-30 mesh range and 10-18 mesh range, as well as samples including a 20 mesh and 30 mesh particle size distributions. Each sample blend was transferred by hand to a 4"×4"×½" where it was heated for 6 minutes at 200° F. under 1,000 psi of pressure, which was a maximum amount of pressure attained with a non-hydraulic laboratory press. The test results for these samples is listed below in Table XII:

TABLE XII

| Sample Number | Rubber Mesh Size | Tear Strength (lbs) | Tensile Strength (psi) | Density (lb/cu ft) |
|---|---|---|---|---|
| A53-39A1 | 10-30 mesh | 50 | 255 | 53.8 |
| A53-39A2 | 10-30 mesh | 52 | 297 | 56.1 |
| A53-39B1 | 10-30 mesh | 74 | 244 | 54.4 |
| A53-39B2 | 10-30 mesh | 63 | 280 | 53.6 |
| A53-39C1 | 20 mesh | 57 | 256 | 54.4 |
| A53-39C2 | 20 mesh | 55 | 265 | 52.0 |

It is noted that a 30 mesh ERRP particle size was tested using 5% by weight of the polyurethane; however, the sample did not remain intact after the molding process. Another sample was tested using 10% by weight of the polyurethane as a binder. Mechanical properties testing demonstrated a tear strength of 74 lbs, tensile strength @break of 321 psi and a density of 60.5 g/in$^3$. In addition, samples including only 3.8% of the polyurethane and 96.2% by weight of the ERRP using the 10-30 mesh, 10-18 mesh and 20 mesh were tested. These samples demonstrated tear strengths ranging from 40 lbs to 62 lbs, and tensile strength ranging from 236 to 305 psi. The 20 mesh sample demonstrated the highest test results including the 62 lbs tear strength and the 305 psi tensile strength.

Given the above test results, the use of polyurethane or polyurea as a binder in amount of about 3-15% by weight, with compression molding taking place at about 1,000 psi to about 4,500 psi at about 250° F. for a resident time of about 10 minutes, will produce structural components that will meet the mechanical properties required for various structural components, including but not limited to railroad ties. The amount of the polyurethane or polyurea is preferable about 5% to about 10% by weight.

As mentioned above, a structural component that may be fabricated from the above-described thermoset composite material is a railroad tie. The railroad tie should be manufactured according to the preferred American Railway Engineering and Maintenance-of-Way Association (AREMA) standards. Accordingly, a typical railroad tie manufactured according to AREMA standard is 7"×9"×102" (or 108").

Furthermore, a thermoset composite material fabricated as described above having a Durometer Shore A of at least 80, a tensile strength of at least 250 psi and a density of about 55 lbs/ft may be AREMA standards for railroad ties.

Figure 2:
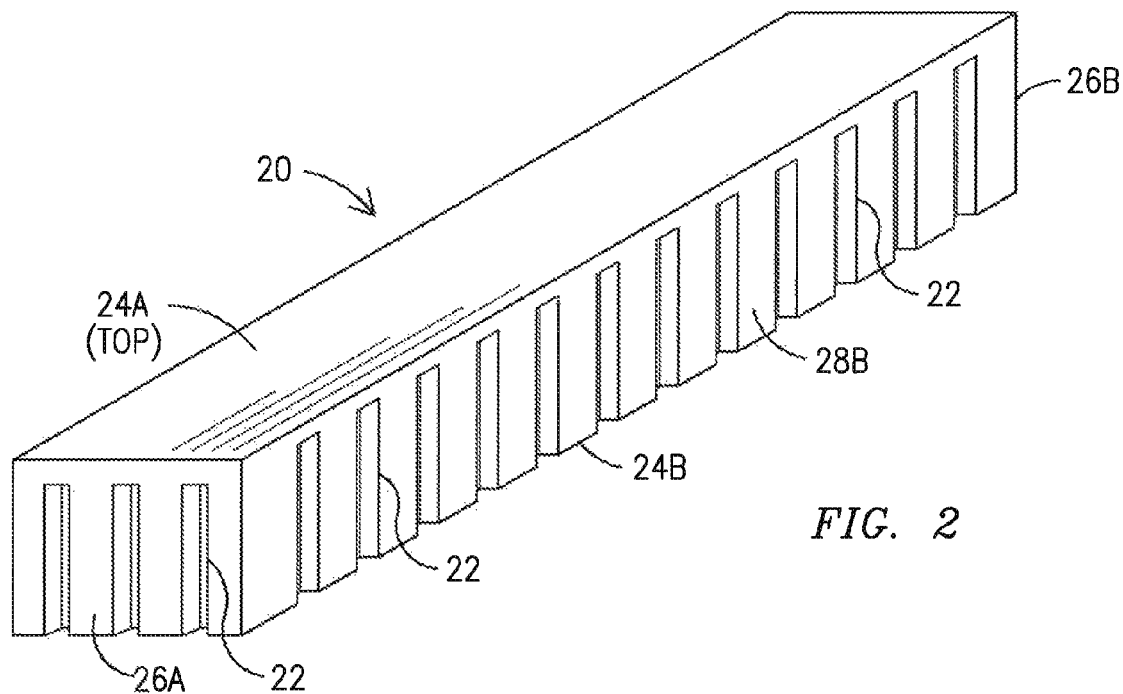
FIG. 2 is a top perspective view of a railroad crosstie comprising the thermoset composite material.
Figure 3:
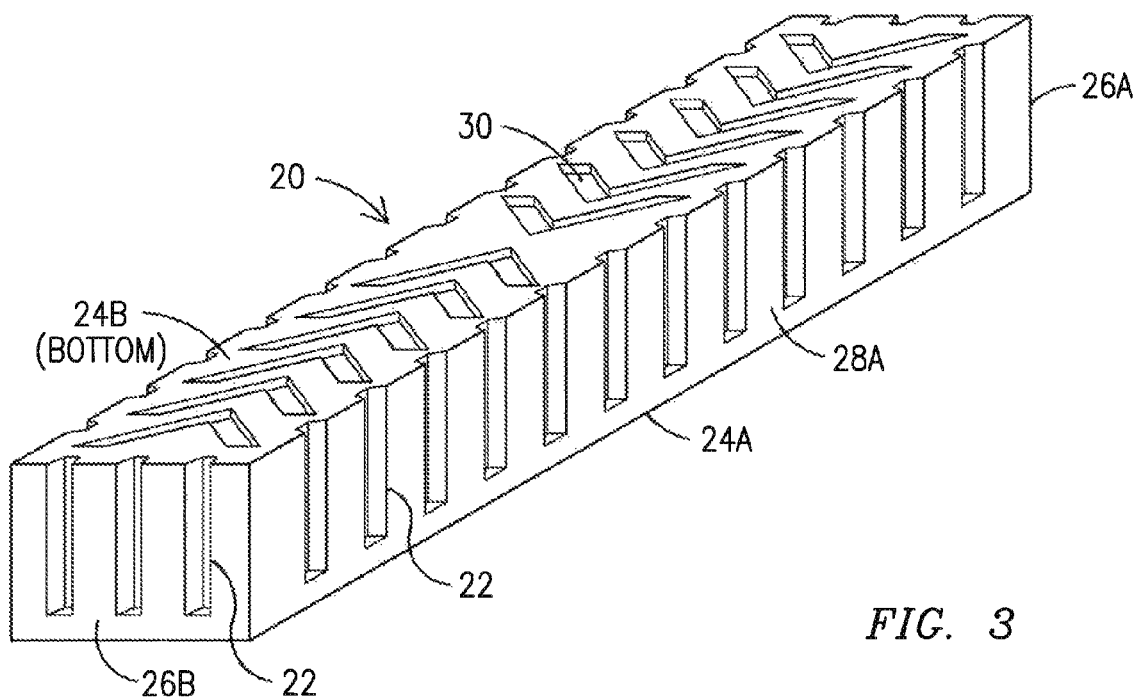
FIG. 3 is a bottom perspective view of the railroad crosstie in FIG. 2.

In an embodiment as shown in FIGS. 2 and 3 a railroad tie 30 configuration has the two vertical sides 28A and 28B, a top side 34A, a bottom side 34B, and opposing ends 26A and 26B. Both vertical sides 28A and 28B and each end 26A and 26B will be provided with substantially straight vertical grooves 32 at a minimum depth of 3/16". As measured vertically from the railroad tie bottom side, grooves on both vertical sides and both ends will terminate at a point so as to provide at least 1"of thickness of full 9'×(102 or 108)" surface area. This configuration allows for vertical ejection of the tie from the compression mold.

In addition, grooves may be provided on the bottom side of the railroad tie configuration. Because of the molding technique (compression molding) used, the groove configuration on the bottom side may consist of chevrons 30 or grooves in the horizontal plane; however, the types of depressions, grooves or indentations on any side of the component may be as simple or complex depending on the molding techniques used. The molded grooves 32 and chevrons 36 provide a structural interlock with the railroad tie and road-bed crushed stone support ballast to thereby prevent longitudinal movement of a railroad tie and rail assembly. Alternate interlocking sidewall configurations are possible, such as tire tread patterns, using hydraulically or pneumatically driven mold side-wall movement.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A composite railroad crosstie, comprising:
   a thermoset composite material comprising a blend of vulcanized recycled rubber particles, a polyurea binding agent, and a filler powder material;
   wherein the blend comprises about 30% to about 97% by weight of the vulcanized recycled rubber particles, and the blend is subjected to a compressive molding force while being heated for a resident time period forming the composite railroad crosstie; and,
   wherein the vulcanized recycled rubber particles have an average size of about 20 mesh to about 40 mesh.

2. The composite railroad crosstie of claim 1 further comprising an additive including a fibrous filler material.

3. The composite railroad tie of claim 2 wherein the blend comprises about 30% to about 70% by weight of the vulcanized rubber particles.

4. The composite railroad tie of claim 2 wherein the blend comprises about 40% to about 50% by weight of the vulcanized rubber particles.

5. The composite railroad tie of claim 1 wherein the thermoset composite material is subjected to compression molding at one or more temperatures ranging from about 200° F. to about 350° F.

6. The composite railroad tie of claim 1 wherein the thermoset composite material comprises about 3% to about 15% by weight of the polyurea binding agent.

7. A composite railroad crosstie, comprising:
   about 30% to about 50% by weight of vulcanized recycled rubber particles;
   about 12% to about 20% by weight of a polyurea binding agent added to the vulcanized rubber particles;
   about 5% to about 15% by weight of a granulated silica material;
   about 10% by wt to about 25% by wt of a fibrous glass material;
   wherein the vulcanized recycled rubber, the polyurea binding agent, and the granulated silica, are subjected to a compression molding force and heat at one or more of about 230° F. to about 270° F. for a resident time period forming the thermoset composite railroad crosstie; and,
   wherein the vulcanized recycled rubber particles have an average size of about 20 mesh to about 40 mesh.

8. A method of assembling a railroad crosstie, comprising:
   developing a thermoset composite material by mixing a blend of vulcanized recycled rubber particles, a polyurea binding agent, and a granulated silica material;
   introducing the blend into a compression mold;
   subjecting the blend to a compressive molding force and heat for a resident time;
   allowing the blend to cool and harden after the resident time has elapsed; and,
   removing the hardened blend from the mold.

9. The method of claim 8 wherein the blend further comprises a fibrous glass material.

10. The method of claim 9 wherein the blend is subjected to a compressive molding at a pressure of at least 1000 psi and at a temperature of at least 200° F. for a resident time.

11. The method of claim 10 wherein the blend is subjected to compressive molding at a pressure of 4,500 psi at a temperature of about 350° F.

* * * * *